US012783682B2

(12) United States Patent
Graupmann et al.

(10) Patent No.: US 12,783,682 B2
(45) Date of Patent: Nov. 3, 2026

(54) ADVERSARIAL GENERATION OF SOFTWARE BILL OF MATERIALS (SBOM) FOR COMPUTING SECURITY

(71) Applicant: INTUIT INC., Mountain View, CA (US)

(72) Inventors: Garrett Prescott Graupmann, Escondido, CA (US); Adam Michael Parsons, Asheville, NC (US); Jacalyn Alice Li, San Diego, CA (US); Jyosthna Bikumalla, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 74 days.

(21) Appl. No.: 18/663,329

(22) Filed: May 14, 2024

(65) Prior Publication Data

US 2025/0356023 A1 Nov. 20, 2025

(51) Int. Cl.
*G06F 21/57* (2013.01)
*G06F 11/3604* (2025.01)
*G06Q 10/0875* (2023.01)

(52) U.S. Cl.
CPC ........ *G06F 21/577* (2013.01); *G06F 11/3612* (2013.01); *G06Q 10/0875* (2013.01)

(58) Field of Classification Search
CPC ........................... G06F 21/577; G06F 11/3612
See application file for complete search history.

(56) References Cited

U.S. PATENT DOCUMENTS

2014/0173737 A1* 6/2014 Toback ................... G06F 21/57 726/25
2014/0244679 A1* 8/2014 Fedorenko ............. G06F 16/40 707/758
2017/0169229 A1* 6/2017 Brucker ................ G06F 21/566
2023/0315439 A1* 10/2023 Castrejon, III ........... G06F 8/70 717/120
2024/0126530 A1* 4/2024 Kairali ...................... G06F 8/61
2024/0330484 A1* 10/2024 DiValentin ................ G06F 8/65
2025/0036557 A1* 1/2025 Ballantyne .......... G06F 11/3688
2025/0110854 A1* 4/2025 Chandramohan ... G06F 11/3604

* cited by examiner

*Primary Examiner* — Hee Soo Kim
(74) *Attorney, Agent, or Firm* — Patterson + Sheridan, LLP

(57) ABSTRACT

Aspects of the present disclosure provide techniques for adversarial software intelligence document generation. Embodiments include scanning, by a computing device, a software application during execution of the software application on a server that is remote from the computing device to determine application attributes and fingerprinting the software application based on the application attributes in order to determine a component application of the software application. Embodiments include utilizing a database of open source software structural information to determine one or more subcomponent applications of the component application and generating, by the computing device, a software intelligence document indicating the component application and the one or more subcomponent applications in a standardized software intelligence document format. Embodiments include performing one or more actions related to computing security based on the software intelligence document.

18 Claims, 5 Drawing Sheets

ADVERSARIAL GENERATION OF SOFTWARE BILL OF MATERIALS (SBOM) FOR COMPUTING SECURITY

INTRODUCTION

Aspects of the present disclosure relate to techniques for automatically generating a software intelligence document such as a software bill of materials (SBOM) based on externally available information through a dynamic scanning, fingerprinting, and data augmentation process.

BACKGROUND

Every year millions of people, businesses, and organizations around the world utilize software applications to assist with countless aspects of life. In many cases it is advantageous to understand and analyze the composition of a software application (e.g., the components and subcomponents of the software application), such as to identify and remediate potential issues related to computing security. For example, a software bill of materials (SBOM) for a software application generally includes a nested inventory of the software application, identifying the components of the application and subcomponents of those components, such as in a standardized format. A software intelligence document such as an SBOM is often generated for a software application in order to identify and manage security vulnerabilities and for software supply chain risk management. For example, particular formats of SBOM documents may be consumable by a variety of software tools, such as tools that perform computing security monitoring, analysis, and/or remedial action.

Generating a software intelligence document such as an SBOM using existing techniques involves accessing internal code, build system(s), and/or documentation relating to a software application. However, in many cases such internal information about a software application is not available. For example, a third party that did not develop a software application and/or otherwise does not have access to internal code and/or documentation for the application may want to generate an SBOM for the application, such as to analyze and/or address security implications of using the application, integrating the application with another application, and/or the like. Generation of a software intelligence document such as an SBOM is not possible in such cases using existing techniques, due to the unavailability of internal code and/or documentation.

Accordingly, there is a need in the art for improved techniques of generating a software intelligence document such as an SBOM, particularly in cases where internal code and/or documentation for a software application in unavailable.

BRIEF SUMMARY

Certain embodiments provide a method for adversarial software intelligence document generation. The method generally includes: scanning, by a computing device, a software application during execution of the software application on a server that is remote from the computing device to determine application attributes; fingerprinting, by the computing device, the software application based on the application attributes in order to determine a component application of the software application; utilizing, by the computing device, a database of open source software structural information to determine one or more subcomponent applications of the component application; generating, by the computing device, a software intelligence document indicating the component application and the one or more subcomponent applications in a standardized software intelligence document format; and performing one or more actions related to computing security based on the software intelligence document.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
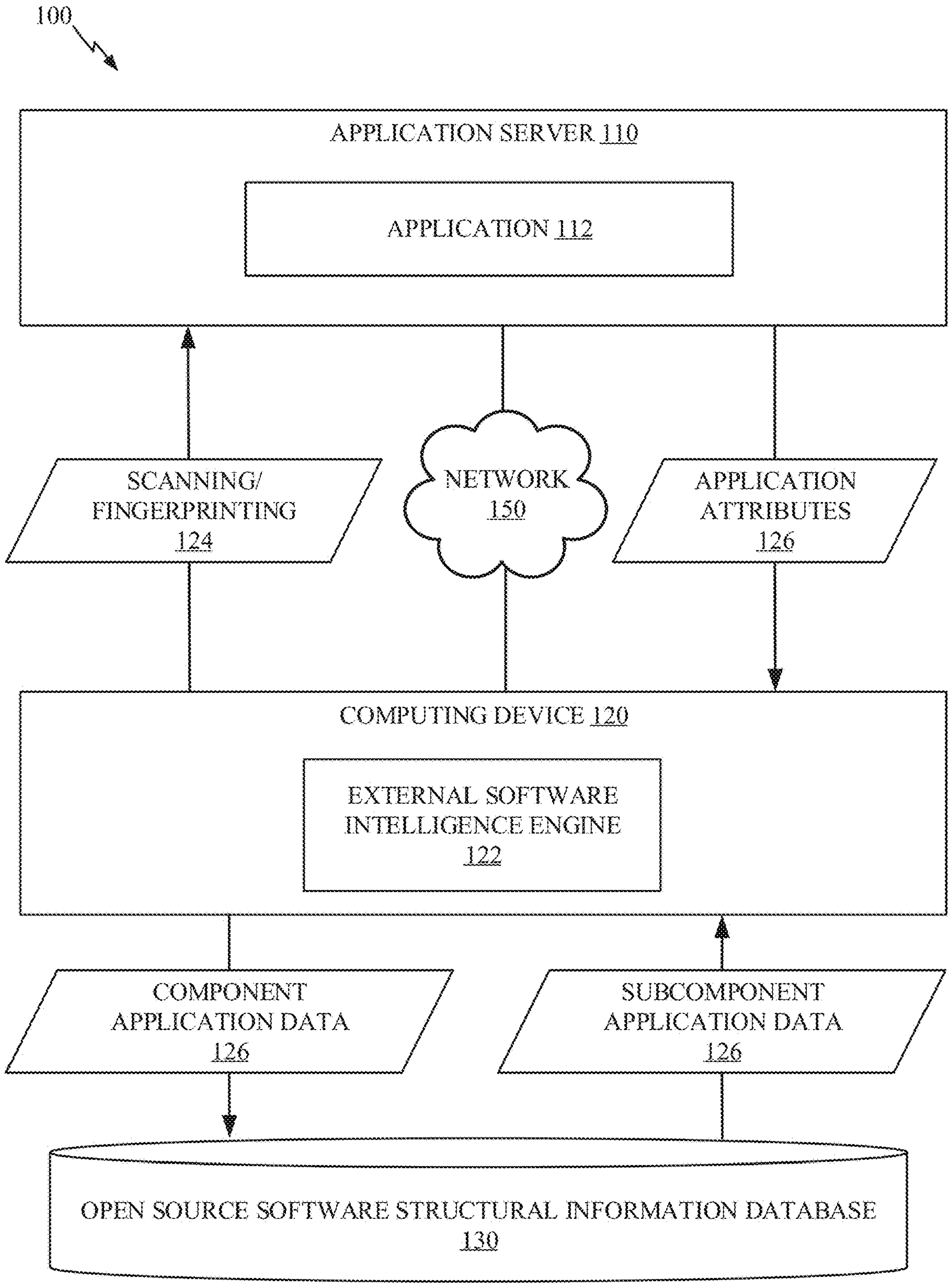
FIG. 1 is a diagram illustrating example computing components related to adversarial software intelligence document generation, according to certain embodiments.

Aspects of the present disclosure provide apparatuses, methods, processing systems, and computer-readable mediums for adversarial software intelligence document generation.

Generating a software intelligence document such as an SBOM is not possible using conventional techniques without access to internal code, build system(s), and/or documentation of a software application. For example, existing techniques for generating such a software intelligence document involve analyzing internal code and/or documentation in order to identify components and subcomponents of a software application, such as based on dependencies and/or components listed in such sources. However, in many cases a third party that did not develop a software application and/or that otherwise does not have access to internal code and/or documentation of the software application may want to generate a software intelligence document for the software application. For example, it may be advantageous to generate a software intelligence document such as an SBOM for use in assessing the security posture of a software application and/or to take action to address potential security issues related to the software application.

As described in more detail below with respect to FIG. 1, an "adversarial" technique may be used to scan and fingerprint a software application from an external perspective (e.g., by a component located on a separate computing device and/or otherwise without having access to internal code, build system(s), and/or documentation of the software application) in order to identify one or more components of the software application. Scanning the software application may involve capturing application attributes such as network addresses, domain name system (DNS) names, open ports, and other surface level application information. Fingerprinting the software application may involve determining whether the software application corresponds to known attributes of and/or otherwise behaves in a manner associated with other particular software components, such as based on the scanning and/or based on invoking application functionality and observing how the software application behaves and/or responds. For example, certain types of responses, logs, errors, and/or other types of behavior and/or application attributes may be known to be associated with particular component applications. Thus, one or more component applications of the software application may be identified through the scanning and fingerprinting process without accessing internal application data for the software application.

Furthermore, open source software structural information (e.g., from a public database of such information) may be used to automatically determine subcomponents of the components identified through scanning and fingerprinting the software application. For example, the names of components identified through scanning and fingerprinting may be used to locate those components in a database of open source software structural information (e.g., through a search) and determine the subcomponents of those components. In some embodiments, the open source software structural information includes attributes and subcomponents of many software applications (e.g., open source applications) that could potentially be component applications of other software applications. Thus, such open source information may be used to augment the information about the composition of a software application that is determined through scanning and fingerprinting, thereby enabling automated determination of the components and subcomponents of a software application without accessing internal application data for the software application. It is noted that a hierarchical tree of dependencies may be determined, such as including multiple levels of components and subcomponents (e.g., subcomponents may have further subcomponents, and so on).

Once the components and subcomponents of a software application have been automatically determined as described herein through scanning, fingerprinting, and augmenting with open source software structural information, a software intelligence document such as an SBOM may be automatically generated. For example, the software intelligence document may be generated according to a particular format, such as one that is understood by and/or compatible with other software applications and/or entities. The software intelligence document may list the component applications of the software application as well as subcomponents of those components, such as including particular attributes of each such component and/or subcomponent. In one example, as described in more detail below with respect to FIG. 3, the software intelligence document comprises a nested tree that includes hierarchical relationships among components and subcomponents of the software application. Components and/or subcomponents may be, for example, modules, plugins, web servers, web frameworks, analytics frameworks, packages, and/or other types of applications that may be included within a software application and/or upon which a software application may otherwise depend.

A software intelligence document generated as described herein may be used for a variety of purposes, as described below with respect to FIG. 2. In some embodiments, a software intelligence document may be provided for display via a user interface, such as to enable a user to analyze the software intelligence document and potentially take action based on the information it contains. In certain embodiments, the software intelligence document may be provided as an input to another software application such as a computing security component that is configured to consume software intelligence documents corresponding to one or more particular formats and perform actions based on the software intelligence document. For example, a computing security component may analyze the software intelligence document in order to identify security vulnerabilities and/or other issues related to the software application that are indicated by the contents of the software intelligence document, and may perform one or more actions to address and/or remediate such vulnerabilities and/or issues. In some embodiments, a computing component that consumes a software intelligence document may generate alerts or reports and/or may take actions such as blocking or restricting a software application, address, user, communication, connection, or other entity in order to prevent a computing security issue. In some cases, a software intelligence document generated according to techniques described herein may be used to determine whether to use a software application, whether to incorporate a software application into another software application, whether to remove a dependency on a software application from another software application, whether to modify or take action with respect to a software application (e.g., to address a security vulnerability), and/or the like. In certain cases, a software intelligence document generated according to techniques described herein may be used to generate another software intelligence document. For example, a software intelligence document for a first software application that includes a second application as a component application may be generated based on a software intelligence document generated for the second software application using techniques described herein.

Techniques described herein improve the technical fields of automated software intelligence document generation and computing security in a number of ways. For instance, by utilizing adversarial techniques to scan and fingerprint a software application in order to automatically identify components of the software application, and by utilizing open source software structural information to automatically determine subcomponents of those components, embodiments of the present disclosure allow a software intelligence document to be automatically generated for the software application even without access to internal data such as code, build system(s), and/or documentation of the software application. Furthermore, by utilizing externally available application attributes and by observing application behavior in response to particular stimuli, techniques described herein allow an application to be automatically fingerprinted for component and subcomponent identification in an accurate manner.

Techniques described herein allow a software intelligence document such as an SBOM to be automatically generated according to a target format based on externally observable data (e.g., including dynamically triggered behavior through a fingerprinting process), and thereby improve computing security by allowing security vulnerabilities to be identified and/or addressed in software applications in cases where such security vulnerabilities could not otherwise be identified and/or addressed (e.g., due to unavailability of internal application data). Furthermore, by generating a software intelligence document such as an SBOM in a standardized format that is compatible with various types of existing software applications that consume such documents, techniques described herein result in a software intelligence document that can be used for a wide variety of tasks through such existing software applications, such as to identify and/or remediate computing security issues.

Example Computing Components Related to Adversarial Software Intelligence Document Generation FIG. 1 is a diagram 100 illustrating example computing components related to dynamic request routing in a computing application, according to certain embodiments.

In diagram 100, an application server 110 is connected to a computing device 120 via a network 150, which may represent any connection over which data may be transmitted (e.g., the Internet). Computing device 120 is further connected to an open source software structural information database 130, such as via network 150 and/or a different network.

Application server 110 generally represents a computing device, such as a server computer, that runs an application 112, which is accessible via one or more external devices such as computing device 120. Application 112 may be any type of software application. In some embodiments, internal data of application 112, such as internal code, build system (s), documentation, and/or the like, is not available (e.g., to external software intelligence engine 122 and/or otherwise to one or more components that perform techniques described herein).

Computing device 120 generally represents a computing device that is separate from application server 110, such as a different server device or a different type of computing device. External software intelligence engine 122 on computing device 120 generally represents a software component that performs functionality described herein related to adversarial software intelligence document generation. For example, external software intelligence engine 122 may generate a software intelligence document such as an SBOM for application 112 as described herein.

Open source software structural information database 130 generally represents a data storage entity that stores information about the components that make up a variety of open source software applications. For example, open source software structural information database 130 may be a publicly accessible database that is populated based on information about a large number of software applications, such as listing component applications and/or other attributes of such software applications. One example of such a database is "deps.dev," which is an online database that provides dependency graphs for a large number of software applications, listing the component applications upon which those software applications depend.

External software intelligence engine 122 may perform scanning/fingerprinting 124 of application 112 in order to determine application attributes 126. Scanning/fingerprinting 124 may involve collecting externally available application attributes, including host data such as network address(es), DNS name(s), open port(s), and/or the like, information about surface level software components such as the name, version, common platform enumeration (CPE), and/or the like, application paths and/or uniform resource locators (URLs), available application source code such as hypertext markup language (HTML), cascading style sheets (CSS), Javascript, or other types of page source code, and/or the like. In some embodiments, scanning/fingerprinting 124 involves invoking certain functionality of application 112 in order to observe the behavior that application 112 exhibits in response. For example, external software intelligence engine 122 may provide particular stimuli to application 112 such as sending requests for certain operations to be performed and/or for certain information to be returned, and may observe the publicly accessible information about how application 112 handles such requests. Such information may include, for example, paths and/or URLs related to how application 112 handles a request, logged information about how application 112 handles a request, details of errors that occur in connection with application 112 handling a request such as error codes, names, or descriptions, the content and/or format of information that application 112 returns in response to a request, the port(s) and/or address(es) used by application 112 in connection with handling a request, and/or the like. In some embodiments, scanning/fingerprinting 124 is based on templates that are configured to gather particular application attributes that can be used to identify the presence of particular component applications. For example, a template executed by external software intelligence engine 122 may involve submitting a particular request to application 112 and determining whether behavior exhibited by application 112 in response to the particular request is consistent with a particular component application and, if so, determining that application 112 includes the particular component application. In one particular example, external software intelligence engine 122 may invoke functionality of application 112 that is expected to generate an error, and the error generated by application 112 is analyzed to determine if it includes a particular code, text, or other attribute known to be associated with a particular component application. In another particular example, external software intelligence engine 122 invokes particular functionality of application 112 expected to cause application 112 to navigate to a particular type of page, and the path or URL of the page that is navigated to is analyzed to determine whether it corresponds to a particular component application.

Generally, external software intelligence engine 122 analyzes application attributes 126 of application 112 in order to determine one or more component applications of application 112. For example, component applications may include other software applications, modules, plugins, servers, frameworks, packages, and/or the like. A component application of application 112 may be included within application 112 and/or referenced by application 112 and/or application 112 may be otherwise dependent upon a component application, and/or the like. It is noted that in some embodiments one or more subcomponents of one or more components of application 112 may also be identified based on scanning/fingerprinting 124, such as if such subcomponents are evident based on application attributes 126. In some cases, versions of component applications are also determined as a result of scanning/fingerprinting 124, such as based on determining whether certain application attributes correspond to a particular version of a particular component application.

External software intelligence engine 122 may utilize open source software structural information database 130 to augment the intelligence gained from scanning/fingerprinting 124. For example, external software intelligence engine 122 may query open source software structural information database 130 using component application data 126 (e.g., the names and, in some embodiments, versions of one or more component applications identified based on scanning/fingerprinting 124) in order to determine subcomponent application data 126, such as identifying one or more subcomponents of the one or more components indicated in component application data 126. In an example, open source software structural information database 130 is searched for the name (and, in some cases, the version) of a component application of application 112 and, if that component application is included in open source software structural information database 130, then the subcomponent applications of that component application are identified based on the information in open source software structural information database 130 (e.g., which may include a dependency tree for the component application indicating its subcomponents and/or other attributes).

External software intelligence engine 122 may then generate a software intelligence document based on the component applications and subcomponent applications of application 112 determined based on scanning/fingerprinting 124, application attributes 126, and subcomponent application data 126. For example, software intelligence engine 122 may populate a software intelligence document with a hierarchical listing of the components and subcomponents of application 112, such as according to a particular format that is compatible with one or more separate software applications that process such documents. In one example, the software intelligence document is an SBOM in a standardized format, such as the CycloneDX format from the Open Worldwide Application Security Project (OWASP)®. Generation and use of the software intelligence document by external software intelligence engine 122 is described in more detail below with respect to FIG. 2. For example, the software intelligence document may be provided to a user, such as via a user interface, and/or the software intelligence document may be provided as an input to a different software application that performs operations (e.g., related to computing security) based on the software intelligence document. In some cases, the software intelligence document may be used to identify a security vulnerability related to application 112, such as based on a known security vulnerability of a component or subcomponent of application 112 that is identified in the software intelligence document. Accordingly, action may be taken to address such a security vulnerability, such as modifying application 112 to remediate the security vulnerability, excluding application 112 from a computing environment or from another application, determining not to use application 112, and/or taking one or more actions to prevent or otherwise address the security vulnerability such as blocking and/or restricting a component, user, address, endpoint, communication, connection and/or the like.

It is noted that while external software intelligence engine 122 is depicted as being on a separate computing device from application 112 and open source software structural information database 130, these components may alternatively be located on the same device and/or on more or fewer devices than those depicted.

Figure 2:
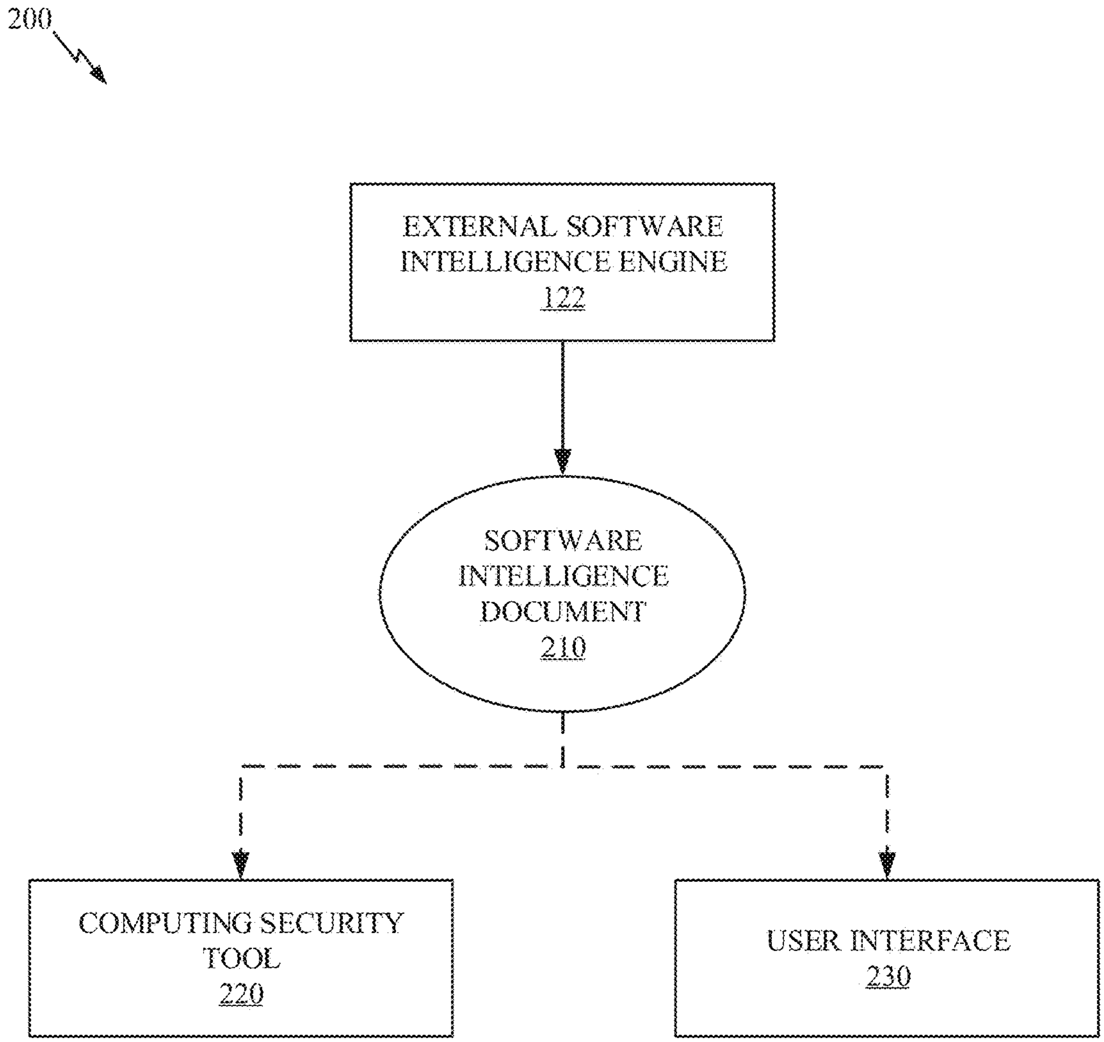
FIG. 2 is a diagram illustrating example generation and use of a software intelligence document, according to certain embodiments.

FIG. 2 is a diagram 200 illustrating example generation and use of a software intelligence document, according to certain embodiments. Diagram 200 includes external software intelligence engine 122 of FIG. 1.

External software intelligence engine 122 generates a software intelligence document 210, such as through a technique described above with respect to FIG. 1. For example, software intelligence document 210 may be an SBOM that is generated (e.g., in a standardized format) based on component applications and subcomponent applications of a software application that external software intelligence engine 122 determined through adversarial techniques such as scanning, fingerprinting, and utilizing an open source software structural information database.

Software intelligence document 210 may specify a hierarchical arrangement of components of a software application, such as application 112 of FIG. 1. For example, software intelligence document 210 may list the components of the application and the subcomponents of those components. In some cases, subcomponents may themselves include subcomponents, and so on, and those subcomponents may also be listed in software intelligence document 210 (e.g., in hierarchical arrangement). Software intelligence document 210 may include attributes of each component and subcomponent, such as the name, version, type, supplier, unique identifier, and/or the like of each component and subcomponent. Software intelligence document 210 may be generated according to a standardized format such as CycloneDX. An example of software intelligence document 210 is described below with respect to FIG. 3.

Software intelligence document 210 may be provided as an input to a computing security tool 220. For example, computing security tool 220 may be a software application that is configured to process a format (e.g., standardized format) corresponding to software intelligence document 210, and may perform operations related to computing security such as monitoring, analysis, alert generation, vulnerability remediation, and/or the like. In one example, computing security tool 220 analyzes software intelligence document 210 and generates alerts when security vulnerabilities are detected (e.g., based on the components and/or subcomponents of the application). In another example, computing security tool 220 is configured to automatically remediate security risks in an application based on software intelligence document 210, such as correcting design flaws, misconfigurations, application programming interface (API) vulnerabilities, and/or the like. In yet another example, computing security tool 220 is a firewall configured to protect a computing environment from malicious dependencies, such as identifying such malicious dependencies based on software intelligence document 210 and blocking access to the computing environment from the application or its component(s) or subcomponent(s) (or addresses, sources, connections, or other entities) determined to be associated with a security risk. In still another example, computing security tool 220 is an attestation service that generates an attestation related to computing security (attesting to an application having no known malicious components or subcomponents) for the application based on software intelligence document 210. These are included as examples, and computing security tool 220 may be representative of many other types of applications configured to perform operations based on software intelligence documents such as SBOMs.

Alternatively or additionally, software intelligence document 210 may be provided to a user, such as via a user interface 230. For example, user interface 230 may display software intelligence document 210 and/or information about software intelligence document 210 (e.g., a summary, a visualization, an attestation, an alert relating to a security vulnerability, and/or the like, which may be generated using a computing security tool 220 or other application) for review by a user. A user may access user interface 230 in order to review software intelligence document 210 and/or related information, and may be enabled to efficiently identify the security vulnerabilities of the application based on the use of a particular format (e.g., standardized format) and/or based on other displayed information such as alerts, summaries, visualizations, and/or the like. A user may determine to take action based on reviewing information via a user interface 230, such as determining to use or not to use the application, excluding the application from a computing environment or other application, modifying or configuring the application (e.g., to remove a dependency), and/or the like.

Example Software Intelligence Document

Figure 3:
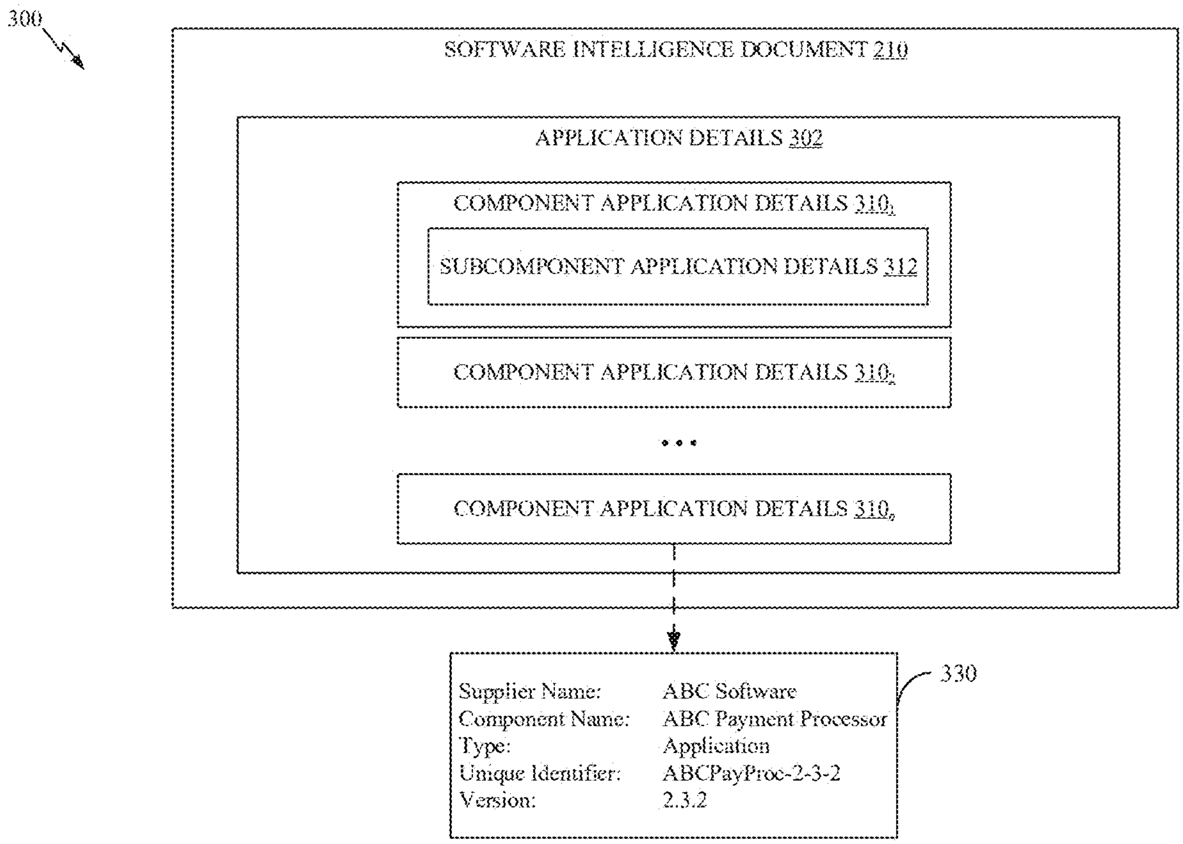
FIG. 3 is a diagram depicting an example of a software intelligence document generated according to techniques described herein, according to certain embodiments.

FIG. 3 is a diagram 300 depicting an example of a software intelligence document generated according to techniques described herein, according to certain embodiments. Diagram 300 includes software intelligence document 210 of FIG. 2, and represents one example of such a document that may be generated using techniques described herein. It is noted that other contents and formats of software intelligence document 210 are possible.

Software intelligence document 210 includes application details 302, which may include information about the application for which software intelligence document 210 was generated. For example application details 302 may include a name, supplier, type, version, unique identifier, and/or the like of the application.

Software intelligence document 210 further includes component application details $\mathbf{310}_{1\text{-}n}$, each of which includes data about a given component application of the application. Software intelligence document 210 further includes subcomponent application details 312, which are nested beneath component application details $\mathbf{310}_1$. The hierarchy shown diagram 300 is included as an example, and different hierarchies of components, subcomponents (and further nested subcomponents at one or more levels) are possible.

Box 330 depicts an example of the data that may be included about the application, about each component, and/or about each subcomponent. For example, box 330 depicts particular example attributes that may be included in component application details $\mathbf{310}_n$, and includes a supplier name ("ABS Software") a component name ("ABC Payment Processor"), a type ("application" as opposed to other example types such as "platform", "server," "framework," and/or the like), a unique identifier ("ABCPayProc2-3-2"), and a version ("2.3.2"). Box 330 is included as one example, and other types of data about an application, component, or subcomponent may be included in software intelligence document 210. Generally, software intelligence document 210 may include a nested tree of components and subcomponents of the application.

Example Operations for Adversarial Software Intelligence Document Generation

Figure 4:
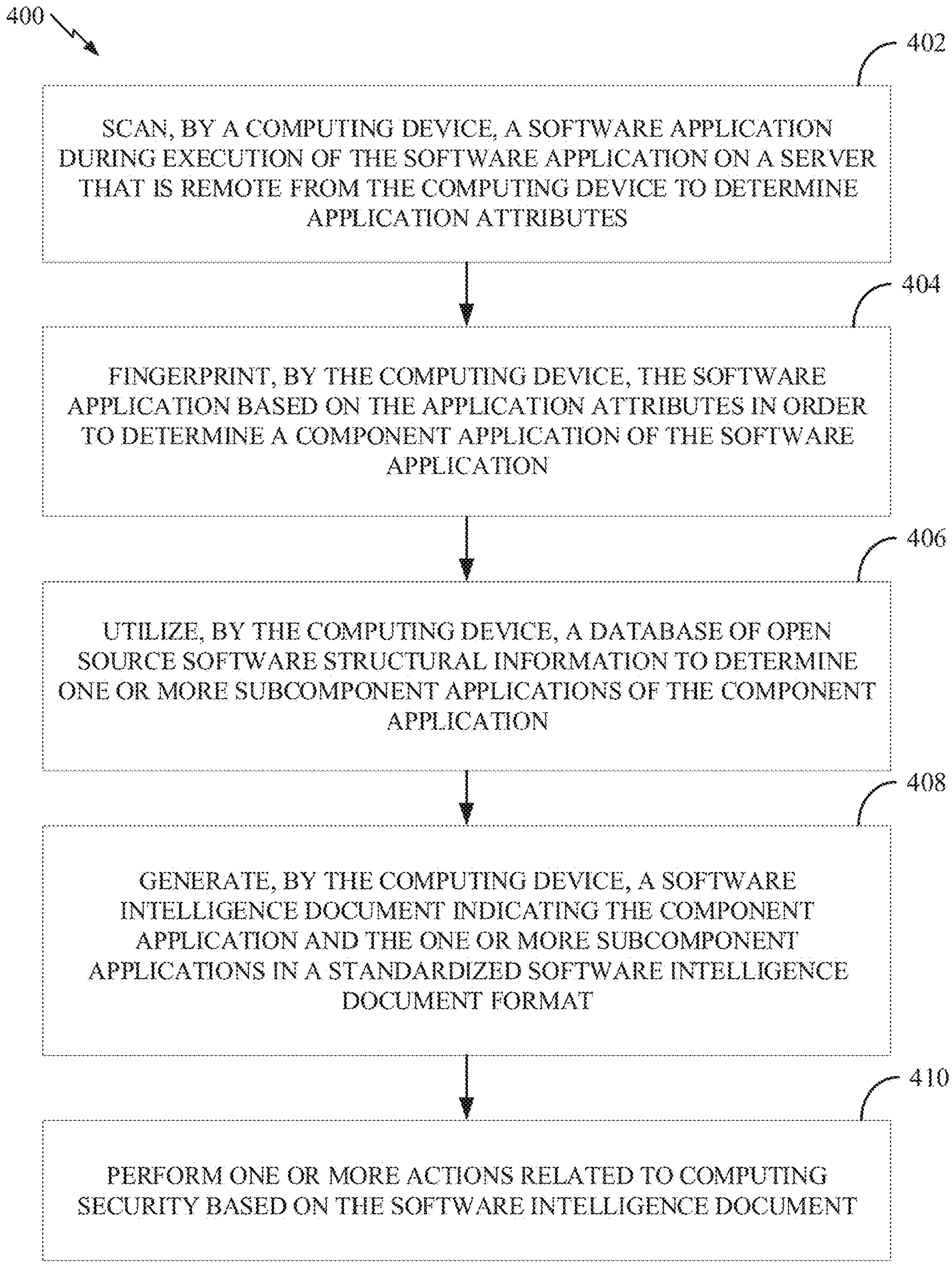
FIG. 4 depicts example operations related to adversarial software intelligence document generation, according to certain embodiments.

FIG. 4 depicts example operations 400 related to adversarial software intelligence document generation, according to certain embodiments. For example, operations 400 may be performed by one or more components described above with respect to FIGS. 1 and 2, system 500A or 500B of FIG. 5A or 5B (described below), and/or one or more other components and/or devices.

Operations 400 begin at step 402, with scanning, by a computing device, a software application during execution of the software application on a server that is remote from the computing device to determine application attributes.

In some embodiments, the scanning of the software application during execution of the software application on the server that is remote from the computing device to determine the application attributes comprises collecting one or more of: a network address; an open port; a domain name system (DNS) name; a name, version, or common platform enumeration (CPE) of a given component application; externally available application source code of the software application; or an application path or universal resource locator (URL).

Operations 400 continue at step 404, with fingerprinting, by the computing device, the software application based on the application attributes in order to determine a component application of the software application.

In certain embodiments, the fingerprinting of the software application based on the application attributes in order to determine the component application of the software application comprises: sending a request to the software application to perform particular functionality; determining a particular application attribute based on the software application performing the particular functionality; and determining that the particular application attribute corresponds to the component application.

In some embodiments, the fingerprinting of the software application based on the application attributes in order to determine the component application of the software application comprises identifying a dependency of the software application on a web server, web framework, analytics framework, package, module, or plugin that is indicated in the application attributes.

In certain embodiments, the fingerprinting of the software application based on the application attributes further comprises determining a version of the component application based on the application attributes.

Operations 400 continue at step 406, with utilizing, by the computing device, a database of open source software structural information to determine one or more subcomponent applications of the component application.

In some embodiments, the utilizing of the database of open source software structural information to determine the one or more subcomponent applications of the component application comprises searching the database for an identifier of the component application that is determined based on the fingerprinting.

Operations 400 continue at step 408, with generating, by the computing device, a software intelligence document indicating the component application and the one or more subcomponent applications in a standardized software intelligence document format.

In some embodiments, the generating of the software intelligence document indicating the component application and the one or more subcomponent applications in the standardized software intelligence document format comprises automatically generating a software bill of materials (SBOM) document for the software application.

Operations 400 continue at step 410, with performing one or more actions related to computing security based on the software intelligence document.

In some embodiments, the performing of the one or more actions related to computing security based on the software intelligence document comprises one or more of: providing the software intelligence document as an input to a software tool that performs computing security monitoring, analysis, or prevention operations; or providing the software intelligence document for display via a display device.

Notably, method 400 is just one example with a selection of example steps, but additional methods with more, fewer, and/or different steps are possible based on the disclosure herein.

Example Computing Systems

Figure 5A:
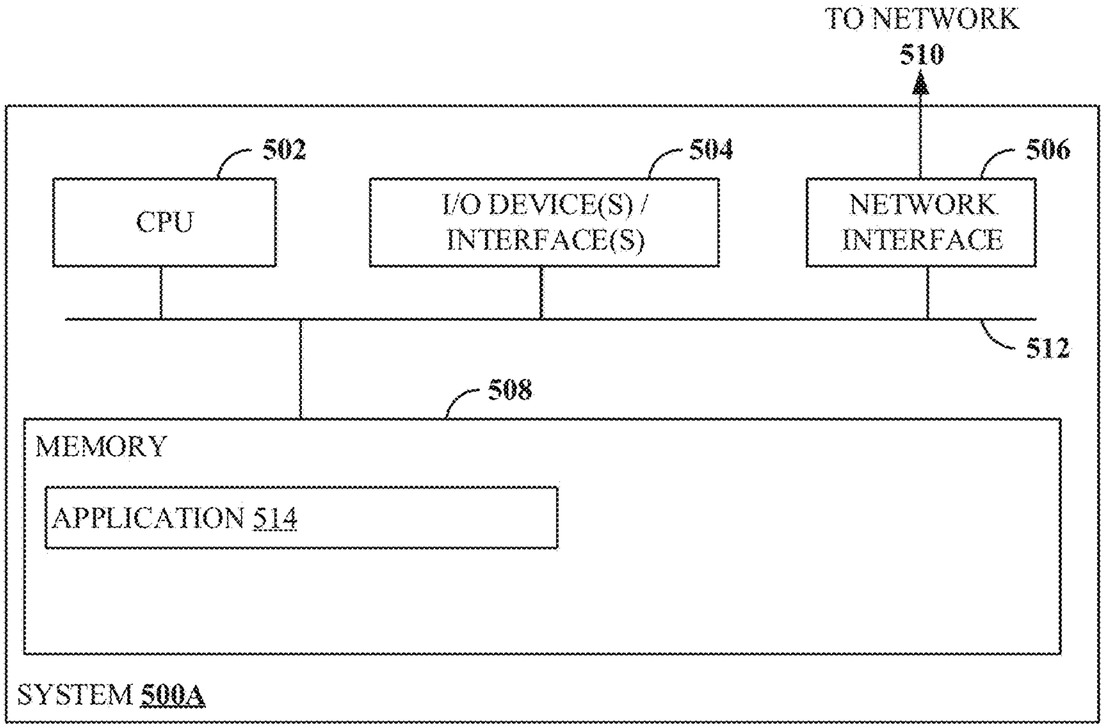
FIGS. 5A and 5B depict example processing systems for adversarial software intelligence document generation, according to certain embodiments.

FIG. 5A illustrates an example system 500A with which embodiments of the present disclosure may be implemented. For example, system 500A may be configured to perform one or more of operations 400 of FIG. 4. In one example system 500A corresponds to application server 110 of FIG. 1.

System 500A includes a central processing unit (CPU) 502, one or more I/O device interfaces 504 that may allow for the connection of various I/O devices 514 (e.g., keyboards, displays, mouse devices, pen input, etc.) to the system 500A, network interface 506, a memory 508, and an interconnect 512. It is contemplated that one or more components of system 500A may be located remotely and accessed via a network 510. It is further contemplated that one or more components of system 500A may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes an application 514, which may be a software application for which a software intelligence document may be generated using techniques described herein. For example, an external software intelligence engine, such as running on a separate computing system (e.g., external software intelligence engine 552 on system 500B of FIG. 5, described below) may generate a software intelligence document for application 514 through an adversarial technique, as described above with respect to FIGS. 1-4. For example, application 514 may be representative of application 112 of FIG. 1.

Figure 5B:
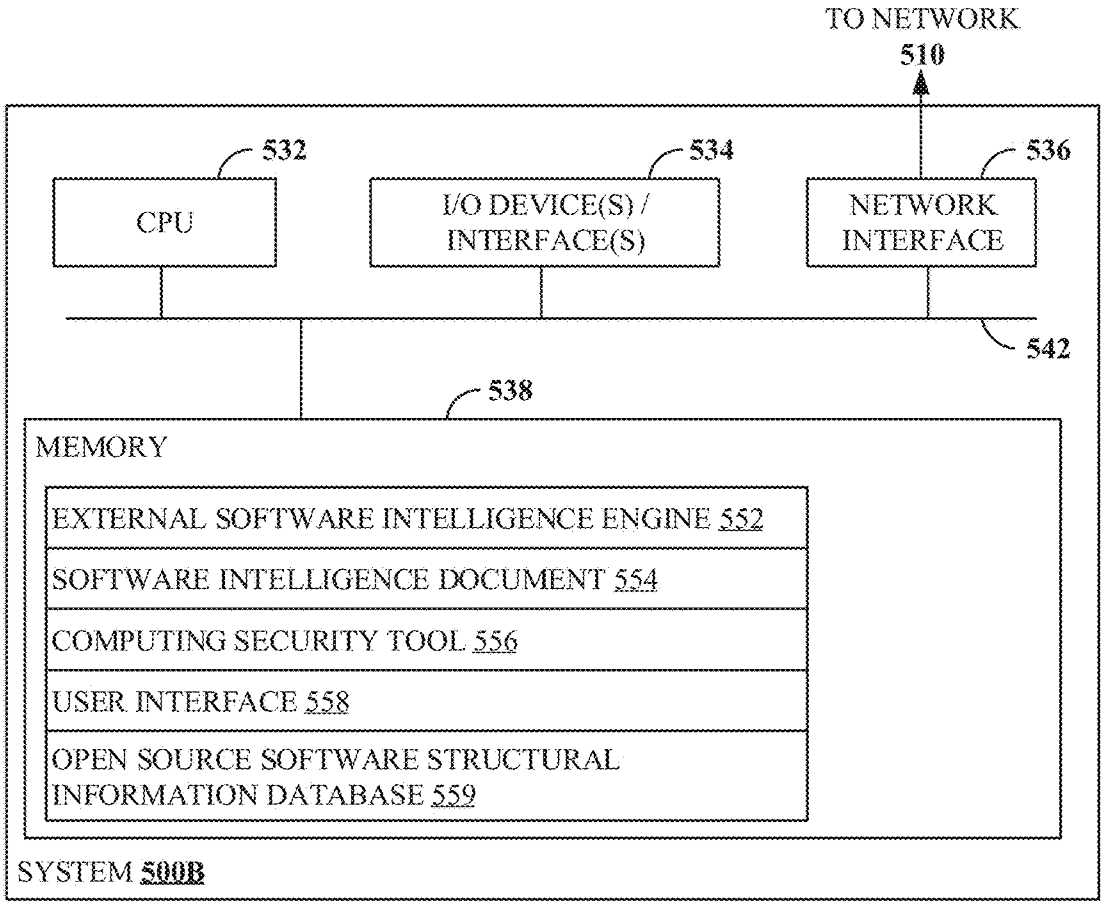

FIG. 5B illustrates another example system 500B with which embodiments of the present disclosure may be implemented. For example, system 500B may correspond to computing device 120 of FIG. 1, and may be configured to perform one or more of operations 400 of FIG. 4.

System 500B includes a CPU 532, one or more I/O device interfaces 534 that may allow for the connection of various I/O devices 534 (e.g., keyboards, displays, mouse devices, pen input, etc.) to the system 500B, network interface 536, a memory 538, and an interconnect 542. It is contemplated that one or more components of system 500B may be located remotely and accessed via a network 510. It is further contemplated that one or more components of system 500B may comprise physical components or virtualized components.

CPU 532 may retrieve and execute programming instructions stored in the memory 538. Similarly, the CPU 532 may retrieve and store application data residing in the memory 538. The interconnect 542 transmits programming instructions and application data, among the CPU 532, I/O device interface 534, network interface 536, and memory 538. CPU 532 is included to be representative of a single CPU, multiple CPUs, a single CPU having multiple processing cores, and other arrangements.

Additionally, the memory 538 is included to be representative of a random access memory or the like. In some embodiments, memory 538 may comprise a disk drive, solid state drive, or a collection of storage devices distributed across multiple storage systems. Although shown as a single unit, the memory 538 may be a combination of fixed and/or removable storage devices, such as fixed disc drives, removable memory cards or optical storage, network attached storage (NAS), or a storage area-network (SAN).

As shown, memory 538 includes an external software intelligence engine 552, which may be representative of external software intelligence engine 122 of FIG. 1 and an open source software structural information database 559, which may be representative of open source software structural information database 130 of FIG. 1. Memory 508 further includes software intelligence document 554, computing security tool 556, and user interface 558, which may be representative of software intelligence document 210, computing security tool 220, and user interface 230 of FIG. 2.

It is noted that systems 500A and 500B are included as examples, and certain functionality described with respect to systems 500A and/or 500B and/or otherwise described herein may be implemented via more or fewer devices and/or components.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for adversarial software intelligence document generation, comprising:

scanning, by a computing device, a software application during execution of the software application on a server that is remote from the computing device to determine application attributes;

fingerprinting, by the computing device, the software application based on the application attributes in order to determine an identifier of a component application of the software application without accessing internal code of the software application, without accessing a build system of the software application, and without accessing documentation of the software application;

utilizing, by the computing device, a database of open source software structural information to determine one or more subcomponent applications of the component application based on searching the database for the identifier of the component application without accessing the internal code of the software application, without accessing the build system of the software application, and without accessing the documentation of the software application;

generating, by the computing device, a software intelligence document indicating the component application and the one or more subcomponent applications in a standardized software intelligence document format without accessing the internal code of the software application, without accessing the build system of the software application, and without accessing the documentation of the software application; and performing one or more actions related to computing security based on the software intelligence document.

2. The method of claim 1, wherein the scanning of the software application during execution of the software application on the server that is remote from the computing device to determine the application attributes comprises collecting one or more of:

a network address;

an open port;

a domain name system (DNS) name;

a name, version, or common platform enumeration (CPE) of a given component application;

externally available application source code of the software application; or an application path or universal resource locator (URL).

3. The method of claim 1, wherein the fingerprinting of the software application based on the application attributes in order to determine the component application of the software application comprises:

sending a request to the software application to perform particular functionality;

determining a particular application attribute based on the software application performing the particular functionality; and determining that the particular application attribute corresponds to the component application.

4. The method of claim 1, wherein the fingerprinting of the software application based on the application attributes in order to determine the component application of the software application comprises identifying a dependency of the software application on a web server, web framework, analytics framework, package, module, or plugin that is indicated in the application attributes.

5. The method of claim 1, wherein the fingerprinting of the software application based on the application attributes further comprises determining a version of the component application based on the application attributes.

6. The method of claim 1, wherein the generating of the software intelligence document indicating the component application and the one or more subcomponent applications in the standardized software intelligence document format comprises automatically generating a software bill of materials (SBOM) document for the software application.

7. The method of claim 1, wherein the performing of the one or more actions related to computing security based on the software intelligence document comprises one or more of:

providing the software intelligence document as an input to a software tool that performs computing security monitoring, analysis, or prevention operations; or providing the software intelligence document for display via a display device.

8. A system for adversarial software intelligence document generation, comprising:

one or more processors; and a memory comprising instructions that, when executed by the one or more processors, cause the system to:

scan, by a computing device, a software application during execution of the software application on a server that is remote from the computing device to determine application attributes;

fingerprint, by the computing device, the software application based on the application attributes in order to determine an identifier of a component application of the software application without accessing internal code of the software application, without accessing a build system of the software application, and without accessing documentation of the software application;

utilize, by the computing device, a database of open source software structural information to determine one or more subcomponent applications of the component application based on searching the database for the identifier of the component application without accessing the internal code of the software application, without accessing the build system of the software application, and without accessing the documentation of the software application;

generate, by the computing device, a software intelligence document indicating the component application and the one or more subcomponent applications in a standardized software intelligence document format without accessing the internal code of the software application, without accessing the build system of the software application, and without accessing the documentation of the software application; and perform one or more actions related to computing security based on the software intelligence document.

9. The system of claim 8, wherein the scanning of the software application during execution of the software application on the server that is remote from the computing device to determine the application attributes comprises collecting one or more of:

a network address;

an open port;

a domain name system (DNS) name;

a name, version, or common platform enumeration (CPE) of a given component application;

externally available application source code of the software application; or an application path or universal resource locator (URL).

10. The system of claim 8, wherein the fingerprinting of the software application based on the application attributes in order to determine the component application of the software application comprises:

sending a request to the software application to perform particular functionality;

determining a particular application attribute based on the software application performing the particular functionality; and determining that the particular application attribute corresponds to the component application.

11. The system of claim 8, wherein the fingerprinting of the software application based on the application attributes in order to determine the component application of the software application comprises identifying a dependency of the software application on a web server, web framework, analytics framework, package, module, or plugin that is indicated in the application attributes.

12. The system of claim 8, wherein the fingerprinting of the software application based on the application attributes further comprises determining a version of the component application based on the application attributes.

13. The system of claim 8, wherein the generating of the software intelligence document indicating the component application and the one or more subcomponent applications in the standardized software intelligence document format comprises automatically generating a software bill of materials (SBOM) document for the software application.

14. The system of claim 8, wherein the performing of the one or more actions related to computing security based on the software intelligence document comprises one or more of:

providing the software intelligence document as an input to a software tool that performs computing security monitoring, analysis, or prevention operations; or providing the software intelligence document for display via a display device.

15. A non-transitory computer readable medium comprising instructions that, when executed by one or more processors of a computing system, cause the computing system to:

scan, by a computing device, a software application during execution of the software application on a server that is remote from the computing device to determine application attributes;

fingerprint, by the computing device, the software application based on the application attributes in order to determine an identifier of a component application of the software application without accessing internal code of the software application, without accessing a build system of the software application, and without accessing documentation of the software application;

utilize, by the computing device, a database of open source software structural information to determine one or more subcomponent applications of the component application based on searching the database for the identifier of the component application without accessing the internal code of the software application, without accessing the build system of the software application, and without accessing the documentation of the software application;

generate, by the computing device, a software intelligence document indicating the component application and the one or more subcomponent applications in a standardized software intelligence document format without accessing the internal code of the software application, without accessing the build system of the software application, and without accessing the documentation of the software application; and perform one or more actions related to computing security based on the software intelligence document.

16. The non-transitory computer readable medium of claim 15, wherein the scanning of the software application during execution of the software application on the server that is remote from the computing device to determine the application attributes comprises collecting one or more of:

a network address;

an open port;

a domain name system (DNS) name;

a name, version, or common platform enumeration (CPE) of a given component application;

externally available application source code of the software application; or an application path or universal resource locator (URL).

17. The non-transitory computer readable medium of claim 15, wherein the fingerprinting of the software application based on the application attributes in order to determine the component application of the software application comprises:

sending a request to the software application to perform particular functionality;

determining a particular application attribute based on the software application performing the particular functionality; and determining that the particular application attribute corresponds to the component application.

18. The non-transitory computer readable medium of claim 15, wherein the fingerprinting of the software application based on the application attributes in order to determine the component application of the software application comprises identifying a dependency of the software application on a web server, web framework, analytics framework, package, module, or plugin that is indicated in the application attributes.

* * * * *